United States Patent [19]

Fisher et al.

[11] Patent Number: 4,767,533
[45] Date of Patent: Aug. 30, 1988

[54] METHOD OF MAKING A FAMILY OF BLENDED FIBER FILTRATION DEVICES

[75] Inventors: Jerry D. Fisher; Susan C. Molthop, both of Mundelein, Ill.

[73] Assignee: Baxter Travenol Laboratories, Inc., Deerfield, Ill.

[21] Appl. No.: 25,468

[22] Filed: Mar. 13, 1987

[51] Int. Cl.$^4$ .............................................. B01D 13/00
[52] U.S. Cl. ............................. 210/321.64; 210/321.8; 264/258
[58] Field of Search ................ 210/500.23, 321.3, 641, 210/321.64, 321.8; 264/258

[56] References Cited

U.S. PATENT DOCUMENTS

| | | | |
|---|---|---|---|
| 3,342,729 | 9/1967 | Strand | 210/641 X |
| 3,489,647 | 1/1970 | Kolobow | 195/1.8 |
| 3,691,068 | 9/1972 | Cross et al. | 210/22 |
| 3,799,873 | 3/1974 | Brown | 210/22 |
| 4,212,744 | 7/1980 | Oota | 210/321.3 |

OTHER PUBLICATIONS

Cross et al "Asymmetric Hollow Fiber Membranes for Dialysis", vol. XVII, Trans. Amer. Soc. Artif. Organs, Jun. 1971.

Primary Examiner—Frank Spear
Attorney, Agent, or Firm—Paul C. Flattery; Daniel D. Ryan; Charles R. Mattenson

[57] ABSTRACT

A method of blending two different sizes or two different types of hollow fiber membranes provides hemodialyzers with specifiable characteristics utilizing standardized housings. The system can blend two different fiber sizes of the same type to achieve a desired ultrafiltration rate in a standard housing. This system can also blend two different types of fibers to be used in a standardized housing to provide a desired ultrafiltration rate.

6 Claims, 3 Drawing Sheets

METHOD OF MAKING A FAMILY OF BLENDED FIBER FILTRATION DEVICES

TECHNICAL FIELD

The invention pertains to methods of manufacture of and to particular types of hollow fiber fluid filtration devices. More particularly, the invention pertains to a method making hemodialyzers which incorporate at least two different fiber members.

BACKGROUND OF THE INVENTION

It has been generally known to make hemodialyzers by utilizing hollow membrane filter elements supported axially within a cylindrical housing. Such housings usually have fluid flow input port and an output port. Fluid injected into the input port flows through the hollow membrane filter elements. The housings also include dialysate input and output ports. The dialysate flows around the exterior surfaces of the hollow membrane filter elements.

The filter elements can be formed from a variety of natural as well as synthetic materials. For example, hollow membrane fibers can be formed of polysulfone, polyethylene, cellulose or cuprammonium. A common form of cuprammonium is available from Enka under the trade name CUPROPHAN. It is also known that use of these differing materials results in dialyzers with substantially different characteristics. Dialyzers of polysulfone and polyethylene are known to be more biocompatible then dialyzers of cuprammonium. On the other hand, polysulfone dialyzers are more expensive than cuprammonium dialyzes. Also, cuprammonium dialyzers have better ultrafiltration performance characteristics than do polysulfone dialyzers.

Whatever the selected hollow fiber material or size, it is necessary to encase the appropriate numbers of fibers in a housing. In the past, dialyzers have been manufactured by arriving at a particular number of fibers, of certain type and size. These fibers can then be encased to provide a dialyzer with the appropriate ultrafiltration perameter.

Casings or housings can be injection or blow molded. A particular housing can be used with only a few different selected number and type of ultrafiltration fibers. In part, this is due to the internal crossection of the housing. In addition, space must be provided around the fibers so that the dialysate can freely flow around same to effect filtration.

Hence, if the number, type, or size of the ultrafiltration fibers is to be altered due to a desire to change the ultrafiltration perameter, or any other characteristic of the dialyzer it may be necessary to create molds to make a new case. This is a very expensive process.

It would be desirable to be able to vary the contents of a hemodialyzer in order to alter the dialyzer parameters while continuing to use existing housings. For example, combining polysulfone with cuprammonium might result in a lower cost dialyzer, than a completely polysulfone dialyzer. Such a dialyzer could still be adequately biocompatible but with greater ultrafiltration performance characteristics than would be the case of a dialyzer having only polysufone fibers. Cuprammonium could also be combined with cellulose acetate or polyethylene. Similarly, it would be desirable to blend fibers of the same type having different radii. However, the prior art does not disclose how to carryout such blending and still use an existing housing. Hence, there is a need for a method of making hemodialyzers which is substantially more flexible and less expensive then known methods.

SUMMARY OF THE INVENTION

In accordance with the invention, a method is provided of making a family of hollow fiber fluid filtration devices with varying filter parameters. The method takes as an initial constraint an existing housing with a predetermined crossection. The crossection could be circular or rectangular. The housing has at least an input port and an output port for the fluid being filtered.

In one form, the method includes the step of specifying the desired hollow membrane fiber sizes to be used. A range of desired filtration factor is also specified.

Preferably, characteristics of hollow fiber dialyzers incorporating the two preferred sizes can be determined. The number of fibers of each size which will fit into the known housing is also determined. The smaller of these two numbers, usually associatied with the larger diameter fiber, is selected. The percentage that this smaller number of fibers is to the larger number is determined.

In an initial trial, a predetermined quantity, N1 of the larger number of fibers is selected. For example, in a preferred embodiment of the method, this number N1 can be set equal to one-half the total number of the smaller diameter fibers which can be used in the housing. Using the predetermined percentage, the corresponding quantity of the smaller number N2 of fibers, which would be the larger diameter fibers, can be determined.

The two determined quantities of different size fibers N1, N2 can then be compared to the available cross-section of the housing to determine if this total number of fibers, N1+N2 will fit within the housing. This determination takes into account a packing factor. This packing factor limits the number of fibers to provide flow space for the dialysate. Assuming that the fibers will fit within the housing, the filtration factor of the filtration device using this particular combination of hollow fiber filter elements can be determined.

The determined filtration factor can then be compared to the range of the specified filtration factor. Assuming that the determined filtration factor falls within the range of this specified filtration factor, the filter can then be assembled using the two quantities of fibers N1 and N2 as previously determined.

In the event that the determined quantity N1+N2 of the two fiber sizes will not fit within the available cross-section of the housing, the number N1 of the smaller diameter fibers can be increased a predetermined amount, for example 2%, and the method repeated. The percentage factor can also be reduced a predetermined amount, for example 2%.

In the event that the determined filtration factor has a value which exceeds the range of the specified filtration factor, the number N1 of fibers having a higher ultrafiltration parameter can be reduced a predetermined amount, for example 2%, and the process can be repeated. In the event that the determined filtration factor has a value which falls below the range of the specified filtration factor, the quantity N1 of fibers having a higher filtration characteristic can be increased a predetermined amount, for example 2%, and the process can be repeated.

Also in accordance with the present invention, the method can be used either with two different fiber sizes or with two different fiber materials each having a predetermined size.

Numerous other advantages and features of the present invention will become readily apparent from the following detailed description of the invention and the embodiments thereof, from the claims and from the accompanying drawings in which the details of the invention are fully and completely disclosed as a part of this specification.

DETAILED DESCRIPTION OF THE PREFERRED EMBODIMENT

Figure 1:
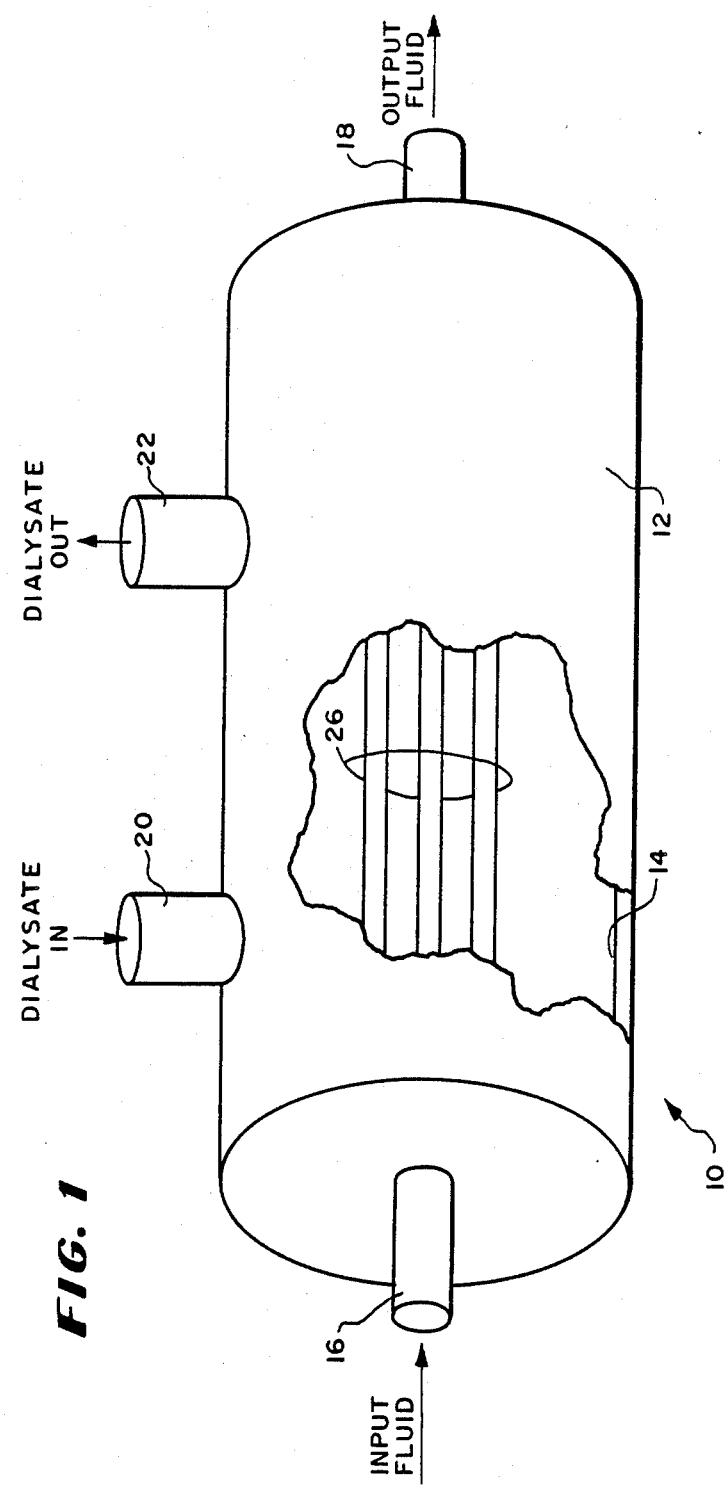
FIG. 1 is a side plan view of a hemodialyzer in accordance with the present invention partly broken away to show the internal structure.

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

With respect to FIG. 1, a hemodialyzer 10 is illustrated having a generally cylindrical housing 12 defining an internal volume 14 therein. Affixed to the housing 12 is an input fluid port 16 and an output fluid port 18. Fluid to be filtered, such as blood, is passed through the dialyzer 10 between the ports 16 and 18.

The dialyzer 10 also includes a dialysate input port 20 and a dialysate output port 22.

The input fluid port 16 and the output fluid port 18 are in fluid flow communication by means of a plurality of hollow membrane filter elements 26. The filter elements 26 are generally hollow and cylindrical in shape and extend axially between the input fluid port 16 and the output fluid port 18. The hollow membrane fibers 26 are packed in the housing 12 with a preselected packing density. The packing density limits the number of fibers to permit the flow of dialysate solution around and past the exterior surfaces of the fibers 26.

Known hemodialyzers have been made with one type of fiber having a single internal diameter. For example, one known hemodialyzer makes use of an existing cylindrical housing having an internal diameter on the order of 1.25 inches. The internal diameter of one known fiber type is on the order of 8 microns. It has been found that 6500 of the 8 micron fibers can be incorporated into a 1.125 diameter case. The ultrafiltration parameter of this dialyzer is 4.2.

It is also been known that 11 micron hollow fibers can be used in the same case. In this instance, 6100 of the 11 micron fibers can be incorporated into the 1.125 diameter case. The ultrafiltration parameter of this dialyzer is 3.0.

Figure 2:
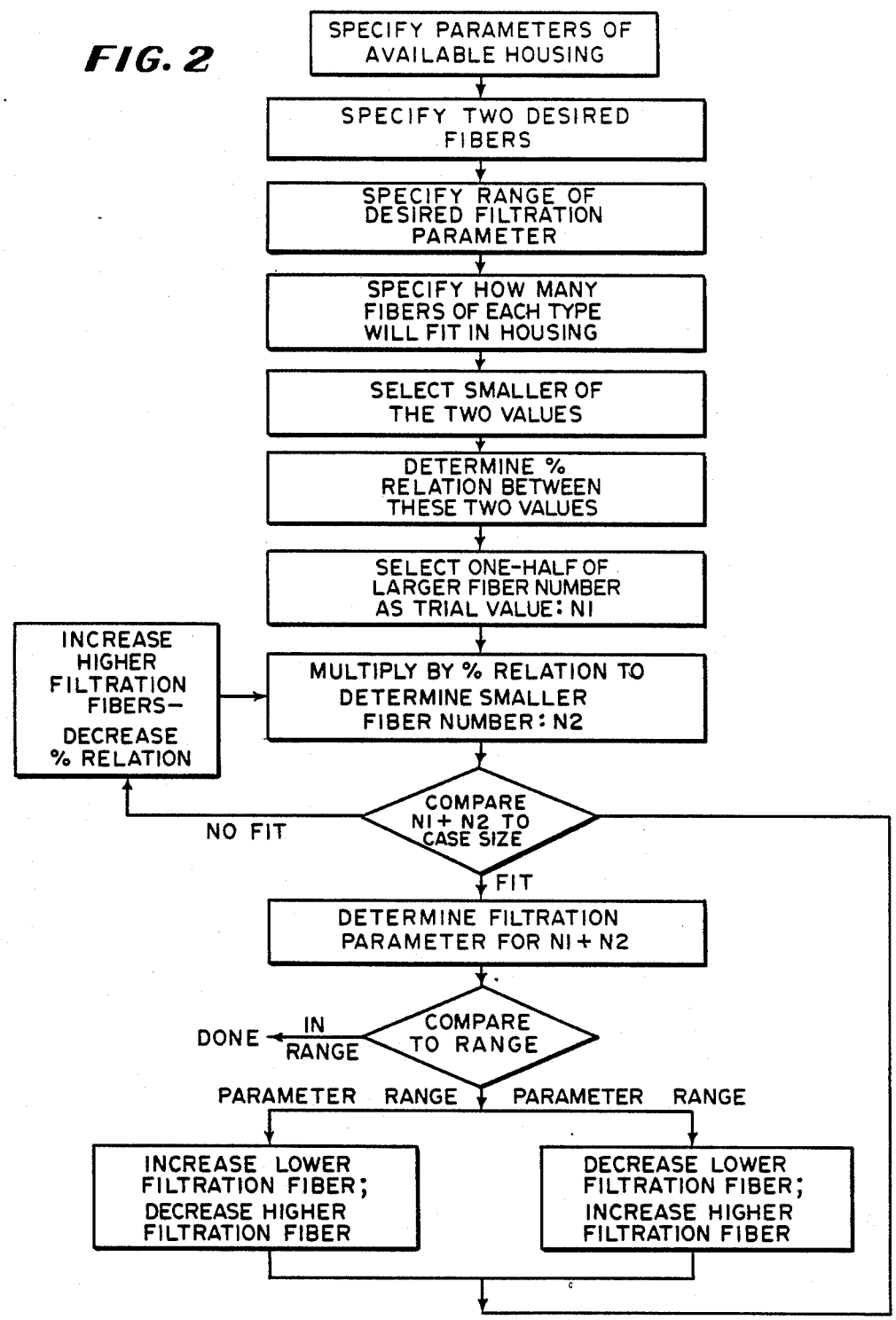
FIG. 2 is an overall block diagram illustrating a method of making a hemodialyzer in accordance with the present invention.

FIG. 2 illustrates in block diagram form a method of making a new hemodialyzer using a blend of 8 micron and 11 micron fibers to provide an ultrafiltration rate between 3.0 and 4.2. The present invention offers a number of important advantages. Blended dialyzers can be expected to cost less then dialyzers which utilize only 8 micron fibers. Further, by being able to blend various fiber sizes, it will be possible to use the same housing size with new or different fiber sizes. A family of dialyzers could be created. By blending 8 and 11 micron fibers, it will be possible to reduce the patient's extracorporeal blood volume. Additionally, it is known that dialyzers using 11 micron fibers may be reused more extensively than dialyzers using only 8 micron fibers. Hence, it is expected that blended dialyzers would have improved reuse when compared to dialyzers using only 8 micron fibers. Finally, its expected that the compliment reaction rate can be reduced from that of a single type of fiber by blending a synthetic with a cellulosic fiber.

In accordance with the method of FIG. 2, the internal diameter of an available dialyzer housing is specified. For example, the above-noted 1.125 inch diameter housing could be utilized. Further, ultrafiltration rates of the two known fiber dialyzers and the desired ultrafiltration range can be specified.

For example, from the known dialyzers, 6500 eight micron fibers will fit into the desired housing. However, only 6100 of the 11 micron fibers will fit into that housing.

In accordance with the method of FIG. 2, the percentage of the number of larger diameter fibers with respect to the number of smaller diameter fibers is determined. This percentage can be utilized to establish the relationship of the blended fibers in the dialyzer.

As an initial trial, one-half, N1, of the known number of smaller diameter fibers can be selected. By means of the percentage factor the number N2 of larger diameter dialyzer fibers can also be determined.

The total number of dialyzer fibers of both sizes N1+N2 can then be compared to the case size to determine whether or not they will properly fit within the existing housing. This comparison utilizes the following equation:

$$\text{CASE I.D.} = \sqrt{\frac{(\text{NUMBER OF FIBERS})*(\text{FIBER O.D. CM})^2}{.3714*(2.54 \text{ CM/IN.})^2}}$$

The factor 0.3714 is a packing factor reflecting permitted density of fiber to housing inner diameter. The factor 2.54 is a conversion factor to convert case internal diameter to inches.

If, based on the above noted equation including the packing density which has been empirically derived, the total number of fibers will fit into the desired case, the ultrafiltration rate for the blended dialyzer can then be determined. Determining the ultrafiltration rate depends first on deriving the ultrafiltration rate per individual fiber of the above two known dialyzers. In the case of the 8 micron dialyzer, the ultra filtration rate is 0.000631/fiber. The ultrafiltration rate fiber of the 11 micron fibers is 0.000492/fiber.

The ultrafiltration rate for the blended dialyzer fiber can then be determined. This determined ultrafiltration rate can then be compared to the specified ultrafiltration range.

For example, if it is desired to make a blended fiber dialyzer having an ultrafiltration rate of 3.5+7%, the present method can be utilized to determine the number of 8 and 11 micron fibers needed. In an initial step, the number of 11 micron fibers, 6100, in the known product is divided by the number of 8 micron fibers, 6500, in the known product to determine a relative percentage. This corresponds to 93.85%.

In the initial trial, one-half of the number of 8 micron fibers is selected. N1 equals 3250 eight micron fibers. The number of 11 micron fibers can be initially determined by multiplying the pecentage, 93.85, by N1 resulting in N2 =3050 eleven micron fibers. The number of 8 micron fibers and the number of 11 micron fibers can then be compared to the housing capacity using the above-noted equation.

The ultrafiltration rate of the dialyzer can then be determied by taking the ultrafiltration rate for each fiber size and multiplying by the corresponding number of fibers. For the 8 micron fibers, this would correspond to an ultrafiltration rate of 2.05. For the 11 micron fibers, this would correspond to an ultrafiltration rate of 1.50. The total ultrafiltration rate is the sum of these two corresponding to 3.55 for the new dialyzer.

Hence, the new blended fiber dialyzer will fall within the range of the specified ultrafiltration rate. The blended fibers can then be positioned in the housing, sealed and the dialyzer sterilized.

Figure 3:
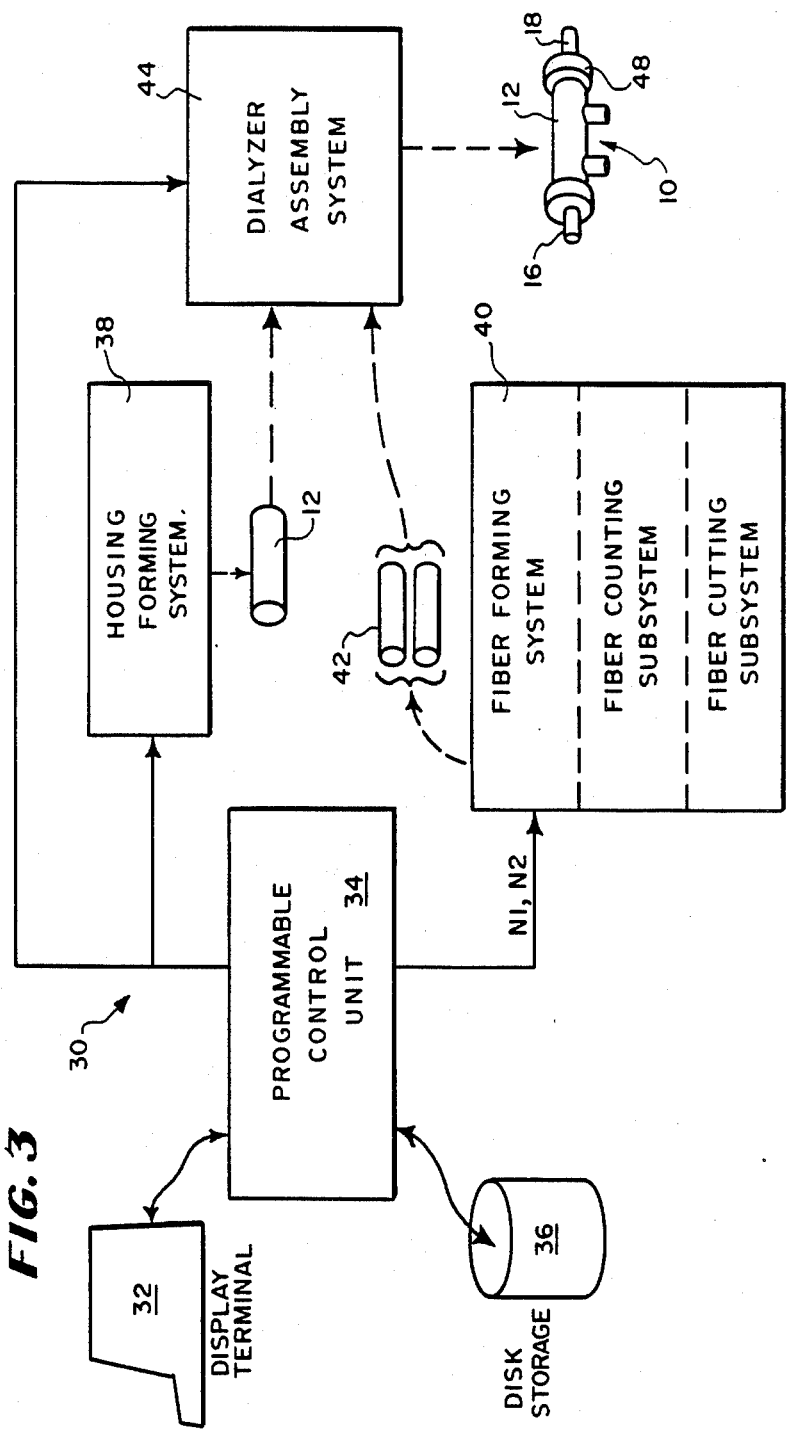
FIG. 3 is a block diagram of a system for making a hemodialyzer in accordance with the present invention.

A system 30 for determining parameters of and assembling blended fiber hemodialyzers is illustrated in block diagram form in FIG. 3. A manually operable display terminal 32 can be used to enter the performance characteristics and constraints through a keyboard. The display terminal is coupled to programmable control unit 34, such as a Hewlet-Packard Model 9836. A disk storage unit 36, coupled to the control unit 34, can be used to store a control program for determining the numbers of each fiber size in accordance with the above-noted method.

A control program could be written in BASIC to carry out various of the above noted steps. This control program can be stored on the disk storage unit 36.

The values of N1 and N2 of each fiber size generated by the control unit 34 can be transferred to a housing forming system 38 and a fiber forming system 40. The housing forming system 38 could be an injection molding system. Housing 12 of a predetermined length and internal diameter can be formed as a molded plastic member. Housings can also be formed by blow molding. Alternately, an extruded rod having a cross section that is circular or in the shape of a parallogram can be cut to the desired length.

The fiber forming system 40 can provide a plurality 42 of hollow membrane fibers having first and second predetermined diameters. The process of fabrication of hollow membrane fibers with a selected internal diameter D usable for separation of a fluid component is well known. The fiber forming system can also cut the fibers to the correct length and collect the desired number N1 and N2 of such fibers. For example, an effective length of 21 cm could be used for all dialyzers in the family.

A dialyzer assembly system 44 can assemble the fibers 42 within the housing 12. In a preferred form of practicing the invention, the fibers are assembled axially in a cylindrical housing. The assembly system can also provide end caps such as caps 48 to seal the fibers 42 within the housing 12 thereby forming the assembled dialyze 10.

In addition to blending two different sizes of fibers, it is also possible, in accordance with the above method, to blend two different types of fibers. For example, using the above method cuprammonium fibers could be blended with polysulfone fibers or polyethlylene fibers. This would result in a lower cost dialyzer for the same or improved ultrafiltration performance then could be realized with the use of only polysulfone fibers. In view of the increased ultrafiltration characteristic of cuprammonium fibers, less surface area would be required to acheive the same ultrafiltration rate. This results in a lower excorporeal blood volume with respect to the patient. This also results in less of the patient's blood being exposed to the device. Further, lower surface area results in a lower priming volume also. Such a blended fiber dialyzer should also cost less then a fully synthetic dialyzer.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A method of making a family of blended fiber filtration devices having differing filtration factors but each having a housing with the same predetermined crossection, the housing having at least input and output ports for the fluid being filtered, the method comprising the steps of:
   (a) specifying at least first and second fiber members with first and second filtration factors to be blended;
   (b) specifying the differing filtration factors desired for the family, each filtration factor being defined as a range of the desired filtration factor;
   (c) determining the numbers of each fiber member which will fit into the housing;
   (d) selecting the smaller of the numbers of the fiber members determined during step (c);
   (e) determining the percent the smaller number of fiber members is of the larger;
   (f) selecting for each range of the desired filtration factor a predetermined quantity of the larger number of fiber members;
   (g) determining the corresponding quantity of the smaller number of fiber members based on the percent value;
   (h) comparing the two determined quantities of fiber members to the available crossection of the housing to determined whether the two determined quantities of fiber members will fit into the housing;
   (i) determining the filtration factor, if in step (h) the determined quantities of fiber members will fit into the housing;
   (j) comparing the determined filtration found in step (i) factor to the range of the specified filtration factor specified in step (b) to determine whether the filtration factor falls within the specified range;
   (k) assembling the two quantities of fibers in the housing if the determined filtration factor falls within the specified range; and
   (l) repeating steps (f) to (k) for each of the specified ranges of desired filtration factors.

2. A method as in claim 1 wherein, if in step (h) the two determined quantities of fibers will not fit into the housing, the quantity of the larger number of fibers is reduced a predetermined amount and steps (g) and (h)

are repeated until the two determined quantities of fibers will fit into the housing.

3. A method as in claim 2 including also reducing the percent value a predetermined amount before repeating steps (g) and (h).

4. A method as in claim 2 wherein the range of filtration factor includes values within ±7% of a desired center value.

5. A method as in claim 1, wherein if in step (j) the determined filtration factor exceeds the specified range, including reducing by a predetermined quantity the number of fibers that have the higher filtration factor and then repeating steps (g)–(k).

6. A method as in claim 1 wherein if in step (j) the determined filtration factor falls below the specified range, including increasing by a predetermined quantity the number of fibers that have a higher filtration factor and then repeating steps (g)–(k).

* * * * *